United States Patent Office 3,502,600
Patented Mar. 24, 1970

3,502,600
PROCESS FOR PREPARING FOAM PLASTICS
Alfred Kühlkamp, Hofheim, Taunus, Rudolf Nowack, Frankfurt am Main, Heinz Lehmann, Kriftel, Taunus, and Reinhold Müller, Hofheim, Taunus, Germany, assignors to Farbwerke Hoechst Aktiengesellschaft vormals Meister Lucius & Bruning, Frankfurt am Main, Germany, a corporation of Germany
No Drawing. Filed July 19, 1966, Ser. No. 566,256
Claims priority, application Germany, June 30, 1965, F 46,760
Int. Cl. C08f 47/08, 53/08
U.S. Cl. 260—2.5                              14 Claims

ABSTRACT OF THE DISCLOSURE

A process for preparing a foam plastic composition which comprises mixing an aqueous plastic dispersion with an organic compound containing at least two acidic hydrogen atoms each on a carbon atom immediately adjacent to an electron-attracting group and with about one equivalent of a carbamate that is the reaction product of a polyamine and carbon dioxide, adding to said mixture about one equivalent of an aldehyde, and reacting said organic compound, said carbamate and said aldehyde to form a foamed plastic composition containing said dispersion.

---

The present invention relates to a process for preparing foam plastics from unfilled and filled aqueous plastics dispersions.

It is known to foam plastics such as urea-formaldehyde resins, phenol formaldehyde resins, polystyrene, polyurethanes and polyvinyl chloride by adding gases soluble in the said plastics or low boiling liquids and heating mixture obtained. The expelled gas or the evaporating liquid causes foam formation.

According to another known process a foaming substance is enriched with air pores by stirring and forms the cellular structure for receiving the plastic.

Still further, chemical expanding processes are known, wherein the separation of a gas from the reaction components brings about foaming during the formation of the plastic.

However, the known processes are unsuitable to foam in a durable manner aqueous systems drying in air, especially aqueous, filled or unfilled plastic dispersions.

It has now been found that aqueous plastics dispersions, with or without content of fillers, can be foamed by adding equivalent amounts each of a compound having at least two CH acid hydrogen atoms and of a reaction product of a polyamine and $CO_2$ and then reacting the mixture with an aldehyde in a reaction corresponding to a polyamino-alkylation.

The amounts of CH acid compounds and of the reaction product of polyamine and $CO_2$ to be added can be vraied within wide limits. A mixture of the said compounds and the plastics dispersion may contain 5 to 95% by weight of plastics dispersion. Mixtures containing 70 to 90% by weight of plastics dispersion are preferably used.

Suitable CH acid compounds are especially polyols, polyamines as well as polyesters and polyethers each containing at least two CH acid groups bound via oxygen or nitrogen. Suitable CH acid groups are, for example, β-ketoacyl groups such as the acetoacetyl radical, the cyanoacetyl radical, the malonyl radical, the nitrophenylacetyl radical, in general acyl groups containing methylene groups activated by adjacent electron-attracting groups.

As polyols there can be used, for example, ethylene glycol, propylene glycol, butane-diol, glycerol, hexanetriol, pentaerythritol and polyfunctional hydroxyl compounds of higher molecular weight.

As polyamines can be used polyfunctional, primary or secondary, aliphatic, heterocyclic or aromatic amines such as ethylene diamine, propylene diamine, hexamethylene diamine, piperazine, phenylene diamine and benzidine.

Suitable polyesters are polycondensation products having a low acid number obtained according to known processes by esterification of polyufnctional alcohols with polyfunctional acids. The following formula illustrates a polyester carrying two CH acid groups to be used in the process of the invention.

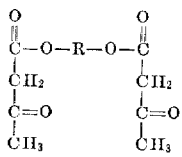

in which R stands, for example, for a polyester radical of adipic acid and ethylene glycol having a molecular weight of about 400 to about 4,000.

Suitable polyethers are homo- or block polymers obtained, for example, from ethylene oxide, propylene oxide, or tetrahydrofurane according to known processes.

The aforesaid reaction components containing CH acid groups may be replaced wholly or partially by copolymers containing CH acid components. Suitable copolymers are, for example, those of any monomer with vinyl or allyl esters of β-ketocarboxylic acids, especially acetoacetic acid, furthermore with polymerizable dicarbonyl compounds and with polymerizable compounds containing activated hydrogen atoms bound to carbon atoms via electron-attracting groups such as the nitrile or carbonyl group, esters of malonic acid with unsaturated alcohols, such as divinyl or diallyl malonate. Reaction products of polyamines and $CO_2$ suitable in the process of the invention are known compounds which have been described in literature (cf. "The Chemical Structure of Some Diamine Carbamates" J. Am. Soc. 73, page 1829 (1951). The carbamates to be used are obtained by reacting at least bifunctional primary or secondary amines with $CO_2$.

To carry out the process of the invention formaldehyde is preferably used as aldehyde. The reaction may also be performed, however, with higher aldehydes, for example acetaldehyde or crotonldehyde.

According to the process of the invention unfilled and filled plastics dispersions can be foamed. As plastics dispersions can be used those which have been obtained by homo- or copolymerizing in known manner unsaturated compounds such as vinyl esters, vinyl chloride, maleic acid esters, fumaric acid esters, acrylic acid esters, methacrylic acid esters, acrylonitrile, styrene, butadiene or ethylene. Depending on the intended application the following fillers may be used: chalk, talc, heavy spar, gypsum, lithopon, mica, quartz powder, sand, powdered asbestos, wood powder, cork powder, man made staple fibers glass fibers, pumice gravel, or asbestos fibers.

The foam plastics obtained by the process according to the invention are especially useful for isolating buildings against noise and heat. The use of aqueous plastics dispersions, which have been employed for a long time in paints and adhesives, warrants a good adherence of the foam to the common supports such as stone, plaster or wood. Foaming is suitably brought about in machines operating according to the multicomponent system. By the process according to the invention blocks, webs or sheetings, in general shaped articles, can be produced in continuous or discontinuous manner. Moreover, hollow spaces and sandwich constructions may be filled with foam. In the latter case, care must be taken that water can escape. A special advantage of the process according to the invention resides in that foam coatings may be directly applied to ceilings, walls and floors by means of a multicomponent spraying gun.

The following mode of operation has proved advantageous:

The compound carrying CH acid groups and the reaction product of polyamine and $CO_2$ are introduced while stirring into the aqueous plastics dispersion which may be filled with inorganic or organic substances, and the mixture obtained is then rapidly mixed with the aldehyde. The mixture forms a foam and as soon as it has reached the maximum height it has practically solidified. Equivalent amounts are used of the compound carrying CH acid groups, the reaction product of polyamine and $CO_2$ and of the aldehyde.

When foaming is brought about in a machine, the reaction speed can be well regulated by means of the aldehyde dosage.

Shortly after the introduction of the aldehyde, a gas is evolved the amount of which exactly corresponds to the condensation rate as illustrated by the following assumed reaction scheme:

$$2R\text{—}CH + {}^+N\text{—}R'\text{—}N\text{—}C\diagup^O_{O^-} + 2R''\text{—}C\diagup^O_H$$

$$R\text{—}C\text{—}\underset{H}{\overset{R''}{\underset{|}{C}}}\text{—}N\text{—}R'\text{—}N\text{—}\underset{H}{\overset{R''}{\underset{|}{C}}}\text{—}C\text{—}R + CO_2 + 2H_2O$$

Within certain limits the speed at which the condensation reaction takes place is not critical because a slow condensation together with slowly becoming more and more viscous of the mixture runs parallel to a uniform and low evolution of gas. With a rapid condensation, however, the evolution of gas is correspondingly fast and in this case, too, uniform foaming is warranted by the coupling of the condensation with the liberation of the expanding agent.

In general, an addition of a further expanding agent is not necessary. Moreover, in a regular case heat need not be supplied from the outside, the reaction being fast enough at room temperature.

In special cases it may be of advantage to use concomitantly low boiling solvents, for example liquefied halogen-substituted alkanes or low boiling hydrocarbons or mixtures thereof as expanding agent.

The following examples serve to illustrate the invention but they are not intended to limit it thereto, the parts being by weight unless otherwise stated.

EXAMPLE 1

35 parts of an aqueous copolymeric plastics dispersion of vinyl acetate and dibutyl maleate with a solids content of about 53%
17 parts of titanium dioxide
17 parts of calcium-magnesium carbonate
17 parts of barium sulfate
15 parts of lithopon
2 parts of talc
25 parts of water where thoroughly mixed and into the mixture 15 parts of triacetoacetate of a propoxylated trimethylol propane (molecular weight about 300) and 5.7 parts of piperazine carbamate were introduced while stirring. The mixture was then mixed with 6.6 parts of a 40% aqueous formaldehyde solution while stirring with a rapid stirrer.

The homogenous mixture started almost instantaneously to foam. Foaming was terminated after a few seconds. A foam plastic having fine pores was obtained which could be removed from the mould after a short period of time. It was thoroughly dry after having been kept for 1–2 days at 80° C. and had then reached its final strength. It had a density of about 0.2 to 0.3 g./cc.

EXAMPLE 2

36 parts of an aqueous homopolymeric plastics dispersion of vinyl acetate having a solids content of about 54% were thoroughly mixed with 29 parts of expanded mica and
36 parts of water and into the mixture obtained 15 parts of triacetoacetate of a propoxylated trimethylolpropane (molecular weight about 300) and
5.7 parts of piperazine carbamate were introduced while stirring. The mixture obtained was then admixed, while stirring with a rapid stirrer, with 6.6 parts of a 40% aqueous formaldehyde solution.

The homogenous mixture started foaming almost instantaneously. Foaming was terminated after a few seconds. A foam plastic having fine pores was obtained which could be removed from the mould after a short period of time. After having been kept for 1–2 days at 80° C. it was thoroughly dry and had then its final strength. It had a density of about 0.25 g./cc.

EXAMPLE 3

40 parts of an aqueous copolymeric plastics dispersion of vinyl acetate and acrylic acid butyl ester having a solids content of about 54%
7 parts of titanium dioxide
8 parts of barium sulfate
5 parts of calcium-magnesium carbonate
28 parts of quartz sand (grain size 0.1–1 mm.)
12 parts of quartz powder were thoroughly mixed and into the mixture obtained 15 parts of tetraacetoacetate of a propoxylated pentaerythritol (molecular weight about 400) and
5.7 parts of piperazine carbamate were introduced while stirring. The mixture obtained was then admixed with 6.6 parts of a 40% aqueous formaldehyde solution while stirring with a rapid stirrer.

The homogenous mixture started foaming almost instantaneously. Foaming was terminated after a few seconds. A foam plastic with fine pores was obtained which could be removed from the mould after a short period of time. After having been kept for 1–2 days at 80° C. it was thoroughly dry and had reached its final strength. It had a density of about 0.3 g./cc.

EXAMPLE 4

43 parts of an aqueous copolymeric plastics dispersion of vinyl acetate and butyl maleate having a solids content of about 51%
15 parts of wood powder and
42 parts of water were thoroughly mixed and into the mixture obtained 15 parts of tetraacetoacetate of a propoxylated pentaerythritol (molecular weight about 400) and
5.7 parts of piperizine carbamate were introduced while stirring. The mixture obtained was then mixed while stirring with a rapid stirrer with 6.6 parts of a 40% aqueous formaldehyde solution.

The homogeneous mixture started foaming almost instantaneously. Foaming was terminated after a few seconds. A foam plastic of medium pore size was obtained which could be removed from the mould after a short period of time. It was thoroughly dry after having been kept for 1–2 days at 80° C. and had then reached its final strength. It had a density of about 0.2–0.3 g./cc.

EXAMPLE 5

(Machine foaming)

100 parts of an aqueous homopolymeric plastics dispersion of vinyl acetate having a solids content of about 54%
were thoroughly mixed with
100 parts of expanded mica and into the mixture obtained
30 parts of tetraacetoacetate of a propoxylated pentaerythritol (molecular weight about 400) and
11.4 parts of piperazine carbamate were introduced while stirring.

One container of a usual two-component spraying machine was filled with the reaction mixture thus obtained (component I). The other container was filled with formaldehyde solution as component II. The dosage of the spraying unit was adjusted in a manner such that component I and component II were ejected in a proportion of 10 to 1. A foam plastic with fine and uniform pores was obtained. The foaming time was so short that when spraying on a vertical wall a uniform foam layer could be produced without any material running down. Directly at the end of the reaction the foam plastic had a density of about 0.1 to 0.2 g./cc.

EXAMPLE 6

100 parts of an aqueous copolymeric plastics dispersion of styrene and butadiene having a solids content of about 50%
15 parts of tetraacetoacetate of a propoxylated pentaerythritol (molecular weight about 400) and
5.7 parts of piperazine carbamate were thoroughly mixed and into the mixture
6.6 parts of a 40% aqueous formaldehyde solution were introduced while stirring with a rapid stirrer.

The mixture started at once to foam strongly. Foaming was terminated after a few seconds when the mass had reached its maximum height. After having been kept for 1–2 days at 50° the foam was thoroughly dry. It had a density of about 0.1 g./cc.

What is claimed is:

1. A process for preparing a foam plastic composition which comprises: mixing (A) an aqueous dispersion of (1) a homopolymer of an unsaturated organic monomer or (2) a copolymer of unsaturated organic monomers with (B) an organic compound containing at least two acidic hydrogen atoms each on a carbon atom immediately adjacent a carbonyl group or a nitrilo group, which compound is (1) an aliphatic polyol, (2) a polyester polycondensation product having a low acid number of an aliphatic polyfunctional alcohol and an aliphatic polyfunctional acid, (3) a polyether homopolymerization or block copolymerization product of ethylene oxide, propylene oxide or tetrahydrofurane, (4) an aliphatic, an aromatic or a heterocyclic primary or secondary polyamine, or (5) an organic copolymer containing a $\beta$-ketoacyl, a cyanoacyl, a malonyl or a nitrophenylacyl group, and with (C) about one equivalent of a carbamate reaction product of a polyfunctional primary or secondary amine with carbon dioxide; adding to said mixture (D) about one equivalent of a lower molecular weight aliphatic aldehyde; and reacting said organic compound (B), said carbamate (C) and said aldehyde (D) to form a foamed plastic composition containing said dispersion (A).

2. A process according to claim 1 wherein the organic monomer of said homopolymer (A)(1) is vinyl chloride, acrylonitrile, styrene, butadiene, ethylene, a vinyl ester of a lower alkanoic acid, or a lower alkyl ester of maleic acid, fumaric acid, acrylic acid or methacrylic acid.

3. A process according to claim 1 wherein said copolymer (A)(2) is of vinyl acetate with acrylic acid butyl ester, butyl maleate or dibutyl maleate.

4. A process according to claim 1 wherein said aliphatic polyol (B)(1) is ethylene glycol, propylene glycol, butane-diol, glycerol, hexane-triol or pentaerythritol; said polyamine (B)(4) is ethylene diamine, propylene diamine, hexamethylene diamine, piperazine, phenylene diamine or benzidine; and said organic copolymer (B)(5) contains a vinyl or allyl ester of actoacetic acid or malonic acid.

5. A process according to claim 1 wherein said carbamate (C) is piperazine carbamate.

6. A process according to claim 1 wherein said aldehyde (D) is formaldehyde, acetaldehyde or crotonaldehyde.

7. A process according to claim 1 wherein the acyl of said organic copolymer (B)(5) is acetyl.

8. A process according to claim 1 wherein said plastic composition contains from about 5% to about 95% by weight of said aqueous dispersion (A).

9. A process according to claim 1 wherein said plastic composition contains from about 70% to about 90% by weight of said aqueous dispersion (A).

10. A process according to claim 1 wherein said aqueous dispersion (A) contains a filler.

11. A process according to claim 10 wherein said filler is chalk, talc, heavy spar, gypsum, lithopon, mica, quartz powder, sand, powdered asbestos, wood powder, cork powder, man-made staple fiber, glass fiber, pumice gravel or asbestos fiber.

12. A process according to claim 1 wherein: the organic monomer of said homopolymer (A)(1) is vinyl chloride, acrylonitrile, styrene, butadiene, ethylene, a vinyl ester of a lower alkanoic acid, or a lower alkyl ester of maleic acid, fumaric acid, acrylic acid or methacrylic acid; said copolymer (A)(2) is of vinyl acetate with acrylic acid butyl ester, butyl maleate or dibutyl maleate; (B)(1) is ethylene glycol, propylene glycol, butane-diol, glycerol, hexane-triol or pentaerythritol; (B)(2) is a polyester polycondensation product having a low acid number of an aliphatic polyfunctional alcohol and an aliphatic polyfunctional acid; (B)(3) is a polyether homopolymerization or block copolymerization product of ethylene oxide, propylene oxide or tetrahydrofurane; (B)(4) is ethylene diamine, propylene diamine, hexamethylene diamine, piperazine, phenylene diamine or benzidine; (B)(5) contains a vinyl or allyl ester of acetoacetic acid or malonic acid and said acyl is acetyl; said reaction product (C) is piperazine carbamate; said aldehyde (D) is formaldehyde, acetaldehyde or crotonaldehyde; and said plastic composition contains from about 5% to about 95% by weight of said aqueous dispersion (A).

13. A process according to claim 12 wherein said aqueous dispersion contains as a filler, chalk, talc, heavy spar, gypsum, lithopon, mica, quartz powder, sand, powdered asbestos, wood powder, cork powder, man-made stable fiber, glass fiber, pumice gravel or asbestos fiber.

14. A process according to claim 12 wherein said plastic composition contains from about 70% to about 90% by weight of said aqueous dispersion (A).

References Cited

UNITED STATES PATENTS

| | | | |
|---|---|---|---|
| 2,475,273 | 7/1949 | Adelson et al. | |
| 2,566,255 | 8/1951 | Smith et al. | 260—851 |
| 3,236,913 | 2/1966 | Pfeiffer et al. | 260—851 |
| 3,275,587 | 9/1966 | Weller et al. | |

SAMUEL H. BLECH, Primary Examiner

M. FOELAK, Assistant Examiner

U.S. Cl. X.R.

260—17.3, 17.4, 29.4, 29.6, 29.7, 39, 40, 41, 41.5, 850, 851, 852, 853